(12) United States Patent
Marinier (10) Patent No.: US 11,626,957 B2
(45) Date of Patent: *Apr. 11, 2023

(54) LOGICAL CHANNEL MANAGEMENT IN A WIRELESS COMMUNICATION NETWORK

(71) Applicant: InterDigital Technology Corporation, Wilmington, DE (US)

(72) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,283

(22) Filed: Jan. 14, 2021

(65) Prior Publication Data
US 2021/0135828 A1    May 6, 2021

Related U.S. Application Data

(63) Continuation of application No. 16/852,668, filed on Apr. 20, 2020, which is a continuation of application
(Continued)

(51) Int. Cl.
*H04L 5/00* (2006.01)
*H04L 47/10* (2022.01)
(Continued)

(52) U.S. Cl.
CPC ............ *H04L 5/0053* (2013.01); *H04L 47/10* (2013.01); *H04L 47/266* (2013.01); *H04W 8/04* (2013.01);
(Continued)

(58) Field of Classification Search
CPC ..... H04L 5/0053; H04L 47/10; H04L 47/266; H04W 8/04; H04W 28/0278; H04W 72/0406
See application file for complete search history.

(56) References Cited

U.S. PATENT DOCUMENTS 6,091,717 A    7/2000  Honkasalo
6,501,745 B1  12/2002  Turina et al.
(Continued)

FOREIGN PATENT DOCUMENTS

EP    1 507 352 A1    2/2005
EP       1633086      8/2006
(Continued)

OTHER PUBLICATIONS

3GPP Support Team, "Draft2 minutes of the 58th TSG-RAN WG2 meeting (Kobe, Japan, May 7-11, 2007)," TSG-RAN WG2 meeting #58bis, R2-072901, Orlando, USA (Jun. 25-29, 2007).
(Continued)

*Primary Examiner* — Siming Liu
(74) *Attorney, Agent, or Firm* — Volpe Koenig (57) ABSTRACT

A wireless transmit/receive unit (WTRU) is configured to, on a condition that a serving grant having a non-zero value is too small for transmission of a single protocol data unit (PDU) from any scheduled medium access control-d (MAC-d) flow, transmit scheduling information (SI). The WTRU is further configured to produce a trigger on the condition that the serving grant is too small and the transmission of the SI is based on the produced trigger.

23 Claims, 3 Drawing Sheets

Related U.S. Application Data

No. 16/207,795, filed on Dec. 3, 2018, now Pat. No. 10,630,448, which is a continuation of application No. 15/581,902, filed on Apr. 28, 2017, now Pat. No. 10,148,405, which is a continuation of application No. 14/449,819, filed on Aug. 1, 2014, now Pat. No. 9,641,304, which is a continuation of application No. 12/942,528, filed on Nov. 9, 2010, now Pat. No. 8,797,873, which is a continuation of application No. 11/840,308, filed on Aug. 17, 2007, now Pat. No. 7,830,835.

(60) Provisional application No. 60/839,198, filed on Aug. 21, 2006.

(51) Int. Cl.
| | |
|---|---|
| *H04L 47/26* | (2022.01) |
| *H04W 72/12* | (2023.01) |
| *H04W 72/1263* | (2023.01) |
| *H04W 8/04* | (2009.01) |
| *H04W 28/02* | (2009.01) |
| *H04W 72/04* | (2023.01) |
| *H04W 72/14* | (2009.01) |

(52) U.S. Cl.
CPC ... *H04W 28/0278* (2013.01); *H04W 72/0406* (2013.01); *H04W 72/1252* (2013.01); *H04W 72/1263* (2013.01); *H04W 72/1278* (2013.01); *H04W 72/14* (2013.01)

(56) References Cited

U.S. PATENT DOCUMENTS

| | | | |
|---|---|---|---|
| 6,580,720 B1 | 6/2003 | Francis et al. | |
| 6,785,232 B1 | 8/2004 | Kotser et al. | |
| 7,418,260 B2 | 8/2008 | Lucidarme | |
| 7,447,504 B2 | 11/2008 | Lohr et al. | |
| 7,477,609 B2 | 1/2009 | Agin | |
| 7,580,392 B2 | 8/2009 | Yang et al. | |
| 7,830,835 B2 * | 11/2010 | Marinier | H04W 72/1263 370/235 |
| 7,904,113 B2 | 3/2011 | Ozluturk et al. | |
| 7,948,936 B2 | 5/2011 | Lohr et al. | |
| 7,948,958 B2 | 5/2011 | Vimpari et al. | |
| 8,139,523 B2 | 3/2012 | Usuda et al. | |
| 8,320,340 B2 | 11/2012 | Sim et al. | |
| 8,570,952 B2 | 10/2013 | Terry et al. | |
| 8,582,514 B2 | 11/2013 | Moberg et al. | |
| 8,797,873 B2 * | 8/2014 | Marinier | H04W 72/1263 370/235 |
| 8,861,343 B2 | 10/2014 | Yang et al. | |
| 8,873,474 B2 | 10/2014 | Pelletier et al. | |
| 2002/0154676 A1 | 10/2002 | Kowalewski et al. | |
| 2003/0039267 A1 | 2/2003 | Koo et al. | |
| 2004/0127225 A1 | 7/2004 | Qiu et al. | |
| 2005/0105553 A1 | 5/2005 | Zhang et al. | |
| 2006/0013268 A1 | 1/2006 | Terry | |
| 2006/0104240 A1 | 5/2006 | Sebire et al. | |
| 2006/0146761 A1 | 7/2006 | Kim et al. | |
| 2006/0209896 A1 | 9/2006 | Choi et al. | |
| 2006/0251027 A1 | 11/2006 | Chun et al. | |
| 2006/0280145 A1 | 12/2006 | Revel et al. | |
| 2006/0291429 A1 | 12/2006 | Matusz | |
| 2007/0073895 A1 | 3/2007 | Sebire et al. | |
| 2007/0140102 A1 | 6/2007 | Oh et al. | |
| 2008/0159184 A1 | 7/2008 | Niwano | |

FOREIGN PATENT DOCUMENTS

| | | |
|---|---|---|
| EP | 1689132 | 8/2006 |
| GB | 2 401 760 | 11/2004 |
| WO | 99/41918 | 8/1999 |
| WO | 01/63856 | 8/2001 |
| WO | 04/042993 | 5/2004 |
| WO | 04/098222 | 11/2004 |
| WO | 05/078967 | 8/2005 |
| WO | 06/034747 | 4/2006 |
| WO | 06/067570 | 6/2006 |
| WO | 06/121262 A2 | 11/2006 |
| WO | 07/024099 A2 | 3/2007 |

OTHER PUBLICATIONS

3GPP, 3$^{rd}$ Generation Partnership Project; Technical Specification Group Radio Access Network; Physical Layer Procedures (FDD) (Release 7), 3GPP TS 25.214 V7.5.0 (May 2007), (May 2007).

3GPP, 3$^{rd}$ Generation Partnership Project; Technical Specification Group Radio Access Network; Physical Layer Procedures (FDD) (Release 7), 3GPP TS 25.214 V7.1.0 (Jun. 2006), (Jun. 2006).

3GPP, 3$^{rd}$ Generation Partnership Project; Technical Specification Group Radio Access Network; Medium Access Control (MAC) Protocol Specification (Release 6), 3GPP TS 25.321 V6.13.0 (Jun. 2006), (Jun. 2007).

3GPP, 3$^{rd}$ Generation Partnership Project; Technical Specification Group Radio Access Network; Medium Access Control (MAC) Protocol Specification (Release 6), 3GPP TS 25.321 V6.9.0 (Jun. 2006), (Jun. 2006).

3GPP, 3$^{rd}$ Generation Partnership Project; Technical Specification Group Radio Access Network; Multiplexing and Channel Coding (FDD) (Release 6), 3GPP TS 25.212 V6.8.0 (Jun. 2006), (Jun. 2006).

3GPP, 3$^{rd}$ Generation Partnership Project; Technical Specification Group Radio Access Network; Multiplexing and Channel Coding (FDD) (Release 6), 3GPP TS 25.212 V6.10.0 (Dec. 2006), (Dec. 2006).

3GPP, 3$^{rd}$ Generation Partnership Project; Technical Specification Group Radio Access Network; Multiplexing and Channel Coding (FDD) (Release 7), 3GPP TS 25.212 V7.1.0 (Jun. 2006), (Jun. 2006).

3GPP, 3$^{rd}$ Generation Partnership Project; Technical Specification Group Radio Access Network; Multiplexing and Channel Coding (FDD) (Release 7), 3GPP TS 25.212 V7.5.0 (May 2007), (May 2007).

3GPP, 3$^{rd}$ Generation Partnership Project; Technical Specification Group Radio Access Network; Radio Resource Control (RRC); Protocol Specification (Release 7), 3GPP TS 25.331 V7.5.0 (Jun. 2007), (Jun. 2007).

3GPP, 3$^{rd}$ Generation Partnership Project; Technical Specification Group Radio Access Network; Radio. Resource Control (RRC); Protocol Specification (Release 7), 3GPP TS 25.331 V7.1.0 (2006-06), (Jun. 2006).

3GPP, 3$^{rd}$ Generation Partnership Project; Technical Specification Group Radio Access Network; FDD Enhanced Uplink; Overall description; Stage 2 (Release 6), 3GPP, TS 25.309 V6.6.0 (March. 2006), (March. 2006).

3GPP, 3$^{rd}$ Generation Partnership Project; Technical Specification Group Radio Access Network; 3rd Generation Partnership Project; Medium Access Control (MAC) protocol specification (Release 7), 3GPP TS 25.321 V7.1.0 (Jun. 2006).

3GPP, 3$^{rd}$ Generation Partnership Project; Technical Specification Group Radio Access Network; Physical layer procedures (Release 8), 3GPP TS 36.213 V1.2.0 (May 2007).

3GPP, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.1.0 (Jun. 2007).

3GPP, 3$^{rd}$ Generation Partnership Project; Technical Specification Group Radio Access Network; 3rd Generation Partnership Project; Medium Access Control (MAC) protocol specification (Release 6), 3GPP TS 25.321 V6.5.0 (Jun. 2005).

China National Intellectual Property Adminsitration, Examination Decision on Request for Invalidation, Chinese Patent No. 200780031104.7 (dated Nov. 30, 2020).

(56) References Cited

OTHER PUBLICATIONS

China National Intellectual Property Adminsitration, Examination Decision on Request for Invalidation, Chinese Patent No. 201310189815.4 (dated Nov. 30, 2020).
European Telecommunications Standards Institute, "Universal Mobile Telecommunications System (UMTS); FDD Enhanced Uplink; Overall description; Stage 2 (3GPP TS 25.309 Version 6.1.0 Release 6)", ETSI TS 125 309 V6.1.0 (Dec. 2004).
European Telecommunications Standards Institute, "Universal Mobile Telecommunications System (UMTS); Medium Access Control (MCA) Protocol Specification (3GPP TS 25.321 Version 6.9.0 Release 6)", ETSI TS 125 321 V6.9.0 (Jun. 2006).
*Interdigital Technology Corporation et al., v. Lenovo Holding Company, Inc. et al.,* Memorandum Opinion, C.A. No. 19-1590-LPS (May 10, 2021).
*Lenovo Holding Company, Inc. et al., v. IPR Licensing, Inc.,* Declaration of Craig Bishop, Case No. IPR2020-01505 (Aug. 24, 2020).
*Lenovo Holding Company, Inc. et al., v. IPR Licensing, Inc.,* Declaration of Dr. Mark Mahon, Case No. IPR2020-01505 (Jul. 8, 2021).
*Lenovo Holding Company, Inc. et al., v. IPR Licensing, Inc.,* Declaration of Dr. Apostolos "Paul" K. Kakaes Regarding U.S. Pat. No. 8,797,873, Case No. IPR2020-01505 (Aug. 25, 2020).
*Lenovo Holding Company, Inc. et al., v. IPR Licensing, Inc.,* Deposition of Dr. Apostolos "Paul" K. Kakaes, Case No. IPR2020-01505 (Jun. 25, 2021).
*Lenovo Holding Company, Inc. et al., v. IPR Licensing, Inc.,* Final Written Decision Determining No Challenged Claims Unpatentable, Case No. IPR2020-01505 (Apr. 14, 2022).
*Lenovo Holding Company, Inc. et al., v. IPR Licensing, Inc.,* https://www.3gpp.org/about-3gpp/3gpp-faqs (included as an Exhibit to the Petition for Inter Partes Review) (Aug. 25, 2020).
*Lenovo Holding Company, Inc. et al., v. IPR Licensing, Inc.,* Patent Owner InterDigital's Oral Argument, Corrected Demonstrative Exhibit, Case No. IPR2020-01505 (Jan. 25, 2022).
*Lenovo Holding Company, Inc. et al., v. IPR Licensing, Inc.,* Patent Owner InterDigital's Oral Argument, Demonstrative Exhibit, Case No. IPR2020-01505 (Jan. 20, 2022).
*Lenovo Holding Company, Inc. et al., v. IPR Licensing, Inc.,* Patent Owner's Preliminary Response Pursuant to 37 C.F.R. §42.107, Case No. IPR2020-01505 (Jan. 19, 2021).
*Lenovo Holding Company, Inc. et al., v. IPR Licensing, Inc.,* Patent Owner's Preliminary Sur-Reply, Case No. IPR2020-01505 (Mar. 19, 2021).
*Lenovo Holding Company, Inc. et al., v. IPR Licensing, Inc.,* Patent Owner's Response Pursuant to 37 C.F.R. §42.120, Case No. IPR2020-01505 (Jul. 8, 2021).
*Lenovo Holding Company, Inc. et al., v. IPR Licensing, Inc.,* Patent Owner's Sur-Reply, Case No. IPR2020-01505 (Dec. 1, 2021).
*Lenovo Holding Company, Inc. et al., V. IPR Licensing, Inc.,* Petition for Inter Partes Review of U.S. Pat. No. 8,797,873, Case No. IP R2020-01505 (Aug. 25, 2020).
*Lenovo Holding Company, Inc. et al., v. IPR Licensing, Inc.,* Petitioners' Reply to Patent Owner's Preliminary Response, Case No. IPR2020-01505 (Mar. 8, 2021).
*Lenovo Holding Company, Inc. et al., v. IPR Licensing, Inc.,* Petitioners' Reply to Patent Owner's Response, Case No. IPR2020-01505 (Oct. 14, 2021).
*Lenovo Holding Company, Inc. et al., v. IPR Licensing, Inc.,* Petitioners' Demonstrative Exhibits, Case No. IPR2020-01505 (Jan. 20, 2022).
*Lenovo Holding Company, Inc. et al., v. IPR Licensing, Inc.,* Record of Oral Hearing, Case No. IPR2020-01505 (Jan. 25, 2022).
*Lenovo Holding Company, Inc. et al., v. IPR Licensing, Inc.,* www.3gpp.org/technologies/keywords-acronyms/103-umts (included as an Exhibit to the Petition for Inter Partes Review) (Aug. 25, 2020).
*Lenovo Holding Company, Inc. et al., v. IPR Licensing, Inc.,* www.3gpp.org/ftp/specs/archive/25_series/25.321 (included as an Exhibit to the Petition for Inter Partes Review) (Aug. 25, 2020).
Panasonic, "Content of E-AGCH," 3GPP TSG-RAN WG2#46bis meeting, R2-050817, Beijing, China (Apr. 4-8, 2005).
Qualcomm et al., "Rate-request Proposal," 3GPP TSG-RAN WG2 Meeting #45bis, R2-050179, Sophia Antipolis, France (Jan. 10-14, 2005).
Qualcomm Europe, "Addition of an SI trigger when UE grant <> 0 and at least one process is activated," 3GPP TSG-RAN WG2 Meeting #59, R2-073822, Athens, Greece (Aug. 20-24, 2007).
Third Generation Partnership Project, "Technical Specification Group Radio Access Networks User Equipment (UE) radio transmission and reception (FDD) (Release 1999)," 3GPP TS 25.101 V3.18.0 (Sep. 2005).
Third Generation Partnership Project, "Technical Specification Group Radio Access Networks User Equipment (UE) radio transmission and reception (FDD) (Release 1999)," 3GPP TS 25.101 V3.19.0 (Dec. 2006).
Third Generation Partnership Project, "Technical Specification Group Radio Access Networks User Equipment (UE) radio transmission and reception (FDD) (Release 4)," 3GPP TS 25.101 V4.12.0 (Sep. 2005).
Third Generation Partnership Project, "Technical Specification Group Radio Access Networks User Equipment (UE) radio transmission and reception (FDD) (Release 4)," 3GPP TS 25.101 V4.13.0 (Dec. 2006).
Third Generation Partnership Project, "Technical Specification Group Radio Access Network User Equipment (UE) radio transmission and reception (FDD) (Release 5)," 3GPP TS 25.101 V5.20.0 (Dec. 2006).
Third Generation Partnership Project, "Technical Specification Group Radio Access Network User Equipment (UE) radio transmission and reception (FDD) (Release 6)," 3GPP TS 25.101 V6.12.0 (Jun. 2006).
Third Generation Partnership Project, "Technical Specification Group Radio Access Network User Equipment (UE) radio transmission and reception (FDD) (Release 6)," 3GPP TS 25.101 V6.14.0 (Dec. 2006).
Third Generation Partnership Project, "Technical Specification Group Radio Access Network User Equipment (UE) radio transmission and reception (FDD) (Release 5)," 3GPP TS 25.101 V5.19.0 (Jun. 2006).
Third Generation Partnership Project, "Technical Specification Group Radio Access Network User Equipment (UE) radio transmission and reception (FDD) (Release 7)," 3GPP TS 25.101 V7.4.0 (Jun. 2006).
Third Generation Partnership Project, "Technical Specification Group Radio Access Network User Equipment (UE) radio transmission and reception (FDD) (Release 7)," 3GPP TS 25.101 V7.8.0 (Jun. 2007).
Third Generation Partnership Project, "Technical Specification Group Radio Access Network Physical Channels and Modulation (Release 8)," 3GPP TS 36.211 V1.2.0 (Jun. 2007).
Third Generation Partnership Project, "Technical Specification Group Radio Access Network Radio Interface Protocol Architecture (Release 6)," 3GPP TS 25.301 V6.4.0 (Sep. 2005).
Third Generation Partnership Project, "Technical Specification Group Radio Access Network Radio Interface Protocol Architecture (Release 6)," 3GPP TS 25.301 V7.0.0 (Mar. 2006).
Third Generation Partnership Project, "Technical Specification Group Radio Access Network Radio Interface Protocol Architecture (Release 6)," 3GPP TS 25.301 V7.2.0 (Jun. 2007).
Third Generation Partnership Project, "Technical Specification Group Radio Access Network Medium Access Control (MAC) protocol specification (Release 7)," 3GPP TS 25.321 V7.5.0 (Jun. 2007).
Third Generation Partnership Project, "Technical Specification Group Radio Access Network Medium Access Control (MAC) Protocol Specification (Release 7)," 3GPP TS 25.321, V7.6.0, (Sep. 2007).
Third Generation Partnership Project, Technical Specification Group Radio Access Network Medium Access Control (MAC) Protocol Specification (Release 7), 3GPP TS 25.321, V6.2.0, (Jun. 2004).

(56) References Cited

OTHER PUBLICATIONS

ZTE Corporation, "Correction of Serving Grant update Procedure in E-DCH (Rel-6)," 3GPP TSG-RAN WG2#58, R2-071747, Kobe, Japan (May 7-11, 2007).
ZTE Corporation, "The consideration on Serving Grant update Procedure and RG-STEP Size in E-DCH," 3GPP TSG-RAN WG2#58bis, R2-072448, Orlando, USA (Jun. 25-29, 2007).
3GPP Support Team, "Draft minutes of the 58bis TSG-RAN WG2 meeting, (Orlando, USA, Jun. 25-29, 2007)," TSG-RAN WG2 meeting #59, R2-073623, Athens, Greece (Aug. 20-24, 2007).
Gozalevez, "First HSUPA Live Demonstrations," IEEE Vehicular Technology Magazine, vol. 1, No. 4, pp. 60-65 (Dec. 2006).
Holma et al., HSDPA/HSUPA for UMTS: High Speed Radio Access for Mobile Communications, John Wiley & Sons, pp. 176-180, 205-213 (Apr. 2006).
Huawei, "Periodic triggering of Scheduling Information," 3GPP TSG-RAN-WG2 Meeting #54, R2-062455, Tallinn, Esthonia (Aug. 28-Sep. 1, 2006).
Infineon, "Further clarifications on Scheduling Information," 3GPP TSG-RAN WG2 Meeting #47, R2-051267, Athens, Greece (May 9-13, 2005).
Mobile Europe, "First HSUPA call using data card," available at www.mobileeurope.co.uk/1665 (Oct. 11, 2006).
Nullity Action, OROPE Germany GmbH Petition for Invalidity EP 2 21 318 B1 (Jun. 10, 2022).
Phonearena.com, "Trial HSUPA handset to handset call completed," available at www.phonearena.com/news/trial-HSUPA-handset-to-handset-call-completed_id1038 (Feb. 9, 2006).
Qualcomm Europe, "Handling of insufficient UE grant," 3GPP TSG-RAN WG2 #59, R2-073430, Athens, Greece (Aug. 20-24, 2007).
Qualcomm, "Qualcomm Paves the Way for Next-Generation Services on HSUPA," available at www.qualcomm.com/news/releases/2006/05/04/qualcomm-paves-way-next-generation-services-hsupa (May 4, 2006).
Qualcomm, "Si Transmission Triggering Schemes," 3GPP TSG-RAN WG2 meeting #46bis, R2-050956, Beijing, China (Apr. 4-8, 2005).
Samsung, "Buffer Status Reporting Triggers for EDCH," 3GPP TSG-RAN2 Meeting #46, R2-050346, Scottsdale, USA (Feb. 14-18, 2005).
Samsung, "Buffer Status Reporting Triggers for EDCH," 3GPP TSG-RAN2 Meeting #46bis, R2-050835, Beijing, China (Apr. 4-8, 2005).
Third Generation Partnership Project," Technical Specification Group Services and System Aspects; Technical Specifications and Technical Reports for a UTRAN-based 3GPP system (Release 6)," 3GPP TS 21.101 V6.4.2 (Apr. 2006).
Third Generation Partnership Project," Technical Specification Group Services and System Aspects; Technical Specifications and Technical Reports for a UTRAN-based 3GPP system (Release 6)," 3GPP TS 21.101 V6.7.0 (Jun. 2007).
Third Generation Partnership Project, "Technical Specification Group Radio Access Network; Feasibility Study for Enhanced Uplink for Utra FDD (Release 6)," 3GPP TR 25.896 V6.0.0 (Mar. 2004).
Third Generation Partnership Project, "Technical Specification Group Radio Access Network; Physical channels and mapping of transport channels onto physical channels (FDD) (Release 7)," 3GPP TS 25.211 V7.0.0 (Mar. 2006).
Third Generation Partnership Project, "Technical Specification Group Radio Access Network; Physical channels and mapping of transport channels onto physical channels (FDD) (Release 7)," 3GPP TS 25.211 V7.2.0 (May 2007).
Third Generation Partnership Project, "Technical Specification Group Services and System Aspects; Technical Specifications and Technical Reports for a UTRAN-based 3GPP system (Release 6)," 3GPP TS 21.101 V6.4.1 (Jun. 2006).
ZTE Corporation, "Consideration of RG-STEP Size in E-DCH," 3GPP TSG-RAN WG2#58, R2-071749, Kobe, Japan (May 7-11, 2007).
ZTE Corporation, "Correction of Serving Grant update Procedure in E-DCH (Rel-7)," 3GPP TSG-RAN WG2#58, R2-071748, Kobe, Japan (May 7-11, 2007).
*Interdigital Technology Corporation et al.*, v. *Lenovo Holding Company, Inc., et al.*, Defendants' Final Invalidity Contentions, C.A No. 19-1590 (LPS) (Aug. 30, 2021).

* cited by examiner

LOGICAL CHANNEL MANAGEMENT IN A WIRELESS COMMUNICATION NETWORK

CROSS REFERENCE TO RELATED APPLICATIONS

This application is a continuation of U.S. patent application Ser. No. 16/852,668 filed Apr. 20, 2020, which is a continuation of U.S. patent application Ser. No. 16/207,795 filed Dec. 3, 2018 which issued as U.S. Pat. No. 10,630,448 on Apr. 21, 2020, which is a continuation of U.S. patent application Ser. No. 15/581,902 filed Apr. 28, 2017, which issued as U.S. Pat. No. 10,148,405 on Dec. 4, 2018, which is a continuation of U.S. patent application Ser. No. 14/449,819 filed Aug. 1, 2014, which issued as U.S. Pat. No. 9,641,304 on May 2, 2017, which is a continuation of U.S. patent application Ser. No. 12/942,528 filed Nov. 9, 2010, which issued as U.S. Pat. No. 8,797,873 on Aug. 5, 2014, which is a continuation of U.S. patent application Ser. No. 11/840,308 filed Aug. 17, 2007, which issued as U.S. Pat. No. 7,830,835 on Nov. 9, 2010, which claims the benefit of U.S. Provisional Application No. 60/839,198 filed Aug. 21, 2006, the contents of which are each hereby incorporated by reference herein.

FIELD OF INVENTION

The present invention is related to high speed uplink packet access (HSUPA) wireless communication systems. More particularly, the present invention is related to a method and apparatus for preventing transmission blocking in an HSUPA wireless communication system.

BACKGROUND

The Third Generation Partnership Project (3GPP) Release 6 defines fast control of wireless transmit/receive unit (WTRU) transmissions through Node-B based scheduling in HSUPA. This faster control results in better control of the uplink (UL) noise rise, which allows operation at a higher average UL load without exceeding the threshold, thereby increasing system capacity. In HSUPA, control and feedback occurs through different physical control channels and information elements (IEs).

Node-B commands are conveyed by absolute or relative grant channels, while WTRU feedback is transmitted on an enhanced dedicated physical control channel (E-DPCCH), or "happy bit" within the E-DPCCH, where scheduling information (SI) is appended to the payload. The Node-B commands are expressed by a maximum power ratio over the power of the UL control channel (DPCCH). The happy bit is transmitted within the E-DPCCH along with 2 bits for retransmission sequence number (RSN) and 7 bits for the enhanced transport format combination indication (E-TFCI). All combinations of the 7 E-TFCI bits are defined to mean a specific size of the enhanced transport format combination (E-TFC). The value "0" (7 bits) is defined to mean the transmission of the SI alone. The E-DPCCH is always transmitted along with the enhanced dedicated physical data channel (E-DPDCH) except during compressed mode. Transmission of E-DPCCH alone does not occur.

The WTRU and Node-B are aware how much data can be transmitted for a given power ratio, and this correspondence is controlled by the radio network controller (RNC). Such a scheduled operation is particularly well suited to non-delay-sensitive types of applications, however it may also be used to support more delay-sensitive applications, given the fast resource allocation capabilities.

Under the current standard, data is optionally segmented, and buffered at the radio link control (RLC) layer. The set of possible RLC packet data units (PDU) sizes that are delivered to the medium access control (MAC) layer is configured by radio resource control (RRC) signaling. When segmentation takes place, generally the sizes of the PDUs are configured to be of the order of several hundreds of bits to avoid excessive overhead and obtain good coding performance. Currently, there is no further segmentation at the MAC layer. Accordingly, when a new transmission takes place, an integer number of PDUs, including zero, must be sent.

Since it is not possible to send out a fraction of an RLC PDU, a certain minimum instantaneous bit rate for the WTRU transmission is imposed. For instance, if the PDU size is 320 bits and the transmission time interval (TTI) is 2 milliseconds (ms), the instantaneous bit rate needs to be at least 160 kilobits per second (kbps), without accounting for MAC overhead. Such an instantaneous bit rate translates into a certain minimum transmission power ratio, under which no RLC PDUs can be sent.

During scheduled operation, WTRU transmissions from a given MAC-d flow can be completely interrupted, or "blocked," if the granted power ratio falls under the minimum required to transmit the RLC PDU at the head of buffer. Such a situation may occur out of the control of the serving radio link set, (i.e., Node-B) for a number of reasons. For example, the WTRU may have received a non-serving relative grant requesting a decrease of power from another Node-B, the WTRU may have erroneously decoded a relative or absolute grant command from the serving Node-B, or the WTRU may have several different configured RLC PDU sizes on a given MAC-d flow and a bigger than usual RLC PDU size is up for transmission.

When such a situation occurs, the WTRU cannot transmit until the time it is scheduled to transmit an SI. Until then, and unless the previous SI has been transmitted recently enough for the Node-B to infer that the WTRU buffer is not empty based on its subsequent transmissions, the Node-B has no ability to determine whether transmission stopped because the power ratio fell under the minimum, or simply because the WTRU has nothing to transmit. Accordingly, transmission from the WTRU is delayed until the SI can be transmitted.

This issue imposes a configuration of a small periodicity of SI transmission (T_SIG) for delay-sensitive applications, thereby increasing overhead. Furthermore, even if the Node-B was aware that transmission stopped because the power ratio is too low, when multiple RLC PDU sizes are configured, the Node-B does not know what power ratio to apply to correct the situation. Thus, the Node-B has to find out by trial and error what the correct power ratio is. This results in inefficient resource allocation and/or excessive scheduling delays.

In the current state of the art, transmission of scheduling information (SI) is only allowed under certain conditions such as those described in 3GPP TS 25.321, such as if the user has a grant (power ratio) of zero or has all its processes de-activated and has data to transmit, upon a change of E-DCH serving RLS (base station), or periodically, with a configurable period depending on whether the user has a grant or not. Accordingly, a solution to prevent blocking that would be compatible with the mechanisms defined in the current state of the art may include configuring periodic reporting of the SI with a very low period, such that the SI is transmitted along with almost every transmission of new data. However, overhead may be significantly increased since each SI takes up 18 bits. For instance, assuming a MAC service data unit (SDU) size of 280 bits and a MAC-e header size of 18 bits, this would represent an additional overhead of approximately 6%.

It would therefore be beneficial to provide a method and apparatus for transmission blocking in an HSUPA wireless communication system that is not subject to the limitations of the current state of the art.

SUMMARY

The present invention is related to a method and apparatus for preventing transmission blocking. Transmission of scheduling information (SI) when transmission of a medium access control-d (MAC-d) flow is stopped. The SI is transmitted when the triggering condition is met.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
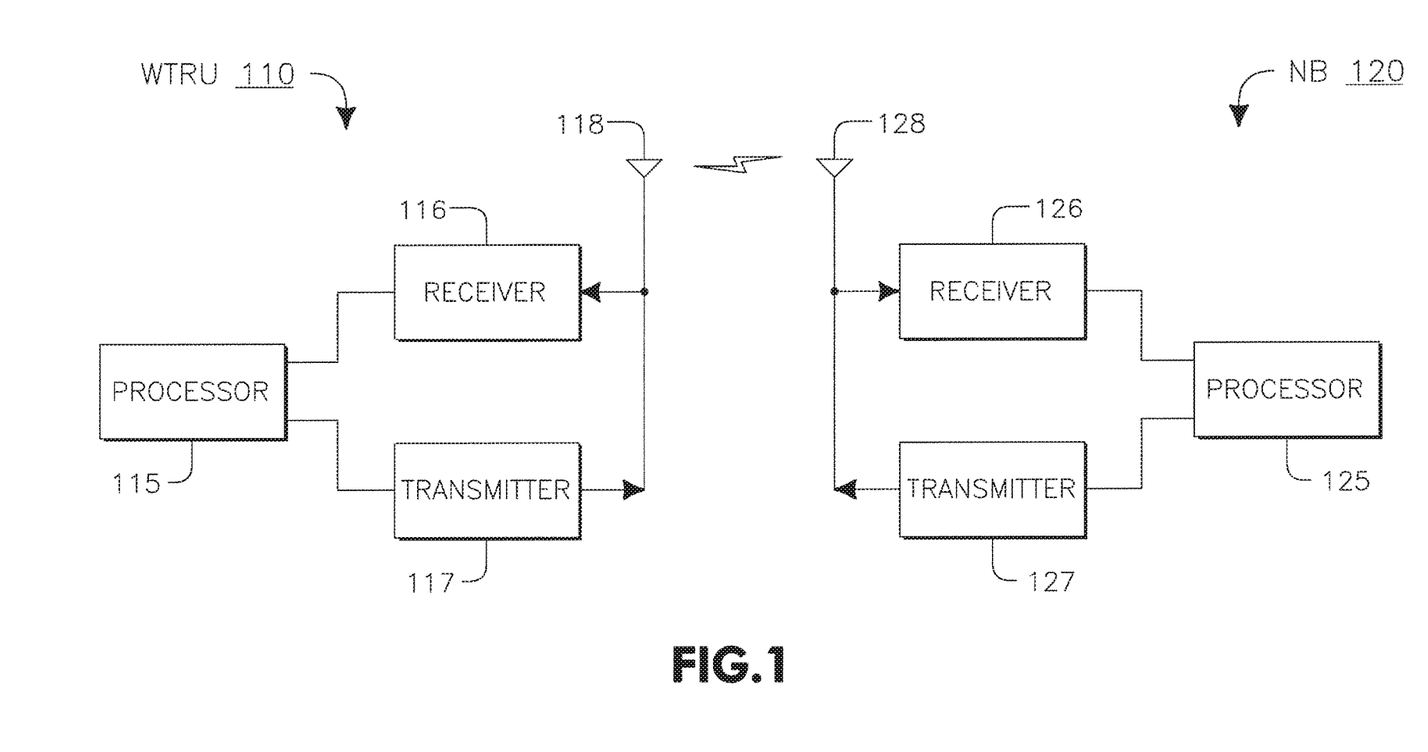
FIG. 1 is a functional block diagram of a WTRU and a Node-B, configured in accordance with the present invention.

FIG. 1 is a functional block diagram 100 of a WTRU 110 and NB 120 configured in accordance with the present invention. As shown in FIG. 1, the WTRU 110 is in communication with the NB 120 and both are configured to perform a method for preventing transmission blocking in an HSUPA wireless communication system in accordance with the present invention.

In addition to the components that may be found in a typical WTRU, the WTRU 110 includes a processor 115, a receiver 116, a transmitter 117, and an antenna 118. The processor 115 is configured to perform a method for preventing transmission blocking in an HSUPA wireless communication system in accordance with the present invention. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical Node-B, the NB 120 includes a processor 125, a receiver 126, a transmitter 127, and an antenna 128. The processor 115 is configured to perform a method for preventing transmission blocking in an HSUPA wireless communication system in accordance with the present invention. The receiver 126 and the transmitter 127 are in communication with the processor 125. The antenna 128 is in communication with both the receiver 126 and the transmitter 127 to facilitate the transmission and reception of wireless data.

Figure 2:
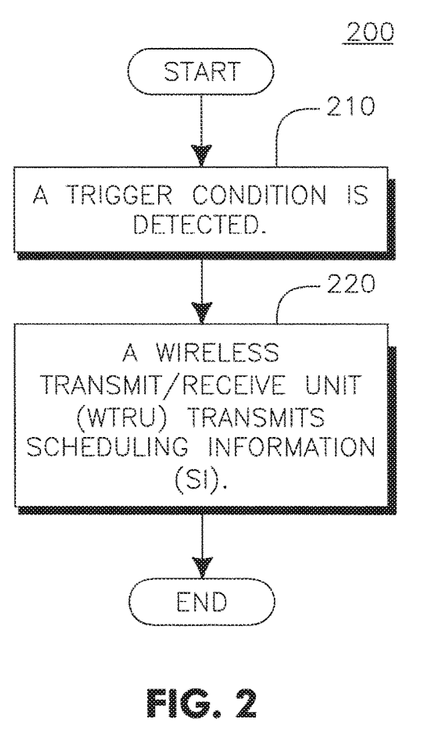
FIG. 2 is a flow diagram of a method for preventing transmission blocking in an HSUPA wireless communication system in accordance with the present invention.

FIG. 2 is a flow diagram of a method 200 for preventing transmission blocking in an HSUPA wireless communication system in accordance with the present invention. In the present embodiment of the present invention, new conditions for the transmission of the SI are created. In step 210, a trigger condition for transmitting an SI is detected. For example, the transmission of the SI alone may occur when the transmission of any, or in a specifically defined, MAC-d flow is stopped because the current non-zero grant is smaller than the minimum required to transmit the next MAC SDU, or RLC PDU, of the particular MAC-d flow. The trigger condition, in this case, may occur when it is not possible to transmit a single PDU of a given MAC-d flow. Preferably, a MAC-d flow is a group of logical channels that may be identified, or specified, with an index.

Once the trigger condition is determined, a particular WTRU 110 transmits the SI (step 220). This transmission may occur once when the triggering condition is met and periodically thereafter, (e.g. over a configurable period), or the transmission may occur at any time the triggering condition occurs. Additionally, the list of MAC-d flows subject to triggering the transmission of SI due to blocking may be signaled by higher layers, as well as the configured periodicity of transmission once the condition is met.

Figure 3:
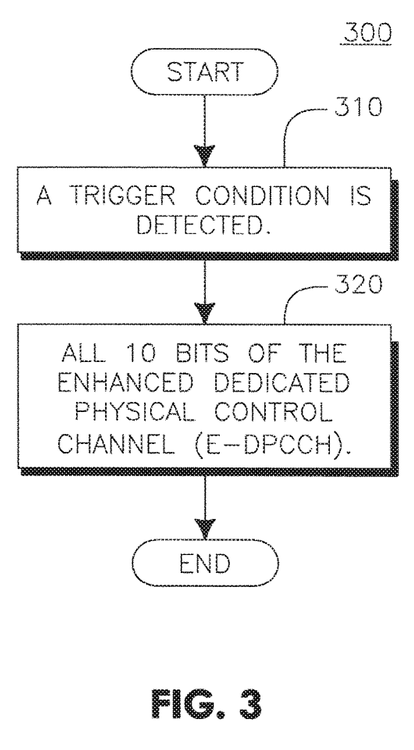
FIG. 3 is a flow diagram of a method for preventing transmission blocking in an HSUPA wireless communication system in accordance with another embodiment of the present invention.

FIG. 3 is a flow diagram of a method 300 for preventing transmission blocking in an HSUPA wireless communication system in accordance with another embodiment of the present invention. In step 310, a trigger condition is detected. Preferably, the trigger condition met in step 310 is substantially similar to the trigger conditions described in step 210 of method 200 above. However, unlike the method 200, when the trigger condition is detected in step 310, instead of transmitting the SI, nothing is transmitted on the E-DPDCH and all 10 bits of the E-DPCCH are set to a value of zero "0" (step 320).

In effect, this corresponds to the same setting as for the initial transmission of an SI alone, except that the SI is not actually transmitted. An advantage of this technique is that the required transmission power may be lowered further than if the SI is actually transmitted. However, the E-DPCCH should be transmitted at a value high enough for the network to detect that something has been transmitted on the E-DPCCH. Additionally, less information may be available to the network about the status of the buffer in the WTRU 110.

Figure 4:
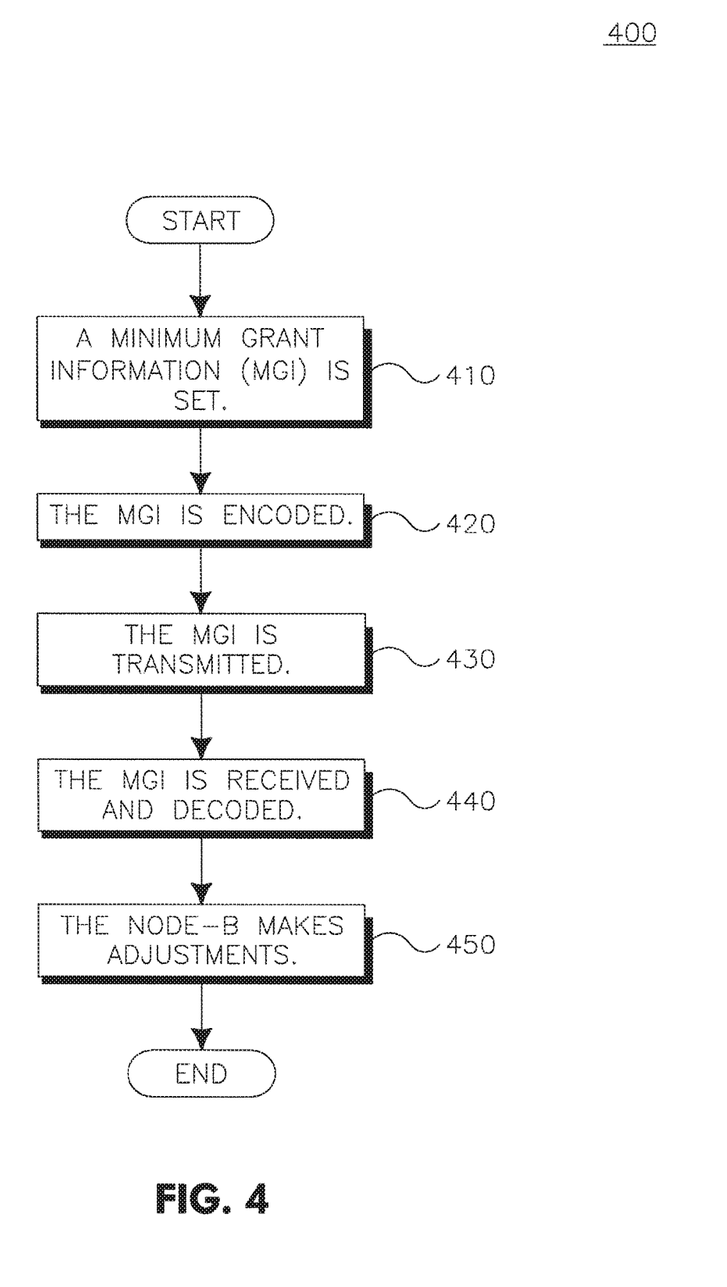
FIG. 4 is a flow diagram of a method for preventing transmission blocking in an HSUPA wireless communication system in accordance with another embodiment of the present invention.

FIG. 4 is a flow diagram of a method 400 for preventing transmission blocking in an HSUPA wireless communication system in accordance with another embodiment of the present invention. In the present embodiment of the invention, improved feedback indicating minimum power ratio or MAC SDU size is utilized.

In the current state of the art, the possible MAC SDU sizes, or equivalently RLC PDU sizes, are configured upon radio bearer setup or reconfiguration through RRC signaling. The NB 120 is also aware of the PDU sizes through NB application part (NBAP) signaling. The power ratio grant required to transmit an E-TFC (MAC-e PDU) of a certain size is known by the WTRU 110, NB 120 and RNC, and any modification is signaled through RRC/NBAP signaling. Thus, using information available with the current standard, the NB 120 could determine what power ratio is required to transmit an E-TFC containing a single RLC PDU for each configured RLC PDU size.

By utilizing the signaling defined in the current standard, the NB 120 may reduce the frequency of occurrence of the issue by never signaling a power ratio to the WTRU 110 that is lower than what is required to transmit the largest RLC PDU size among the RLC PDU sizes configured. It may, however, still be possible that the WTRU 110 blocks transmission because it received a "down" non-serving relative grant or because it misinterpreted a serving grant. The NB 120 should assume the largest RLC PDU because it is not aware of the size of the next RLC PDU in line for transmission at the WTRU's side. As soon as there is more than one RLC PDU size configured, the NB 120 over-allocates resources for the WTRU 110 whenever it is using one of the smaller RLC PDU sizes.

Accordingly, a new type of control information may be signaled by the WTRU 110 to the NB 120, so that the NB 120 may be aware of the minimum power ratio that should be granted to the WTRU 110 with respect to the size of an upcoming RLC PDU buffered for transmission. This information, preferably, may be referred to as the minimum grant information (MGI).

In step 410 of the method 400, the MGI is set. The setting of the MGI may be accomplished in a number of ways. For example, the MGI may be set to the size of the next RLC PDU in line for transmission, (i.e., after the current E-TFC is transmitted), on one of the highest priority MAC-d flows having data in its buffer, or on specific MAC-d flows that may be configured by RRC signaling. Additionally, the MGI may be set according to the size of the largest buffered RLC PDU of the highest priority MAC-d flow. Also, the MGI may be set according to the size of the largest buffered RLC PDU of the highest priority MAC-d flow, or on specific MAC-d flows, expected to be transmitted by a certain delay with the current grant and number of active processes. The delay may be also be configured by RRC signaling.

After determining that the MGI should be transmitted, the MGI is then encoded (step 420). An "upcoming RLC PDU" may be used to describe an RLC PDU that has its size used for setting the value of fields of the MGI. The MGI may then be encoded according to a variety of methods. For example, the MGI may be encoded to consist of 5 bits and represent a power ratio with a mapping, such as bit mapping, similar to that found in the 3GPP TS 25.212 specification. In this case, the signaled power ratio will be the smallest value that allows transmission of the upcoming RLC PDU.

Alternatively, the MGI may be encoded by a smaller number of bits and represent a power ratio. However, in this case, the mapping may be different and have a lower granularity than the mapping found in the 3GPP TS 25.212 specification. For example, the MGI may be encoded with less than 5 bits as described above. Additionally, the mapping might be pre-established.

In another alternative, the MGI may consist of a variable number of bits depending on how many potential RLC PDU sizes should be represented. For instance, in case there are 4 configured RLC PDU sizes, 2 MGI bits would be required, and each combination would represent a specific RLC PDU size. It should be noted that not all configured RLC PDU sizes necessarily need to be mapped. Accordingly, in case only a subset of RLC PDU sizes is mapped, the WTRU 110 sets the MGI according to the smallest RLC PDU size larger than the upcoming RLC PDU.

The MGI is then transmitted by the WTRU 110 (step 430). The triggering of the MGI may occur in one of several ways. For example, the MGI may be transmitted once whenever its value would change in accordance with the MGI settings. Also, the MGI may be transmitted at each of a particular number (N) of new MAC-e transmissions, where N is configurable by the radio resource controller (RRC). Additionally, it may be required that two consecutive transmissions of the MGI are separated by a delay of at least a particular number (M) transmission time intervals (TTI), where M is also configurable by the RRC.

Once transmitted, the MGI is received and decoded by the NB 120 (step 440) preferably at the same time as a MAC-e PDU, and the NB 120 makes adjustments based upon the MGI (step 450). Preferably, the NB 120 adjusts the power ratio to enable transmission of the upcoming RLC PDU buffered for transmission.

In another embodiment of the present invention, the data rate is managed through the use of a scheduling grant. In this embodiment, the transmission is allowed for a minimum number of PDUs ($N_{min}$) of the MAC-d flow for every new MAC-e transmission, without regard to the data rate imposed by the power ratio and without regard to the size of the PDU or PDUs.

Under the current 3GPP standard, (e.g., TS 25.309 Release 6), a MAC-d flow is managed through either non-scheduled transmissions or scheduled grants, but not both. Utilizing non-scheduled transmissions for a given MAC-d flow would overcome problems in the current art for this MAC-d flow, at the expense of a loss of control over the amount of interference generated by this flow.

However, in the present hybrid scheduled/non-scheduled embodiment of the invention, the benefit of scheduling grants in terms of noise rise stability is maintained while ensuring that transmission is never completely blocked due to the granted power ratio falling under the threshold for single PDU transmission. The $N_{min}$ that is allowed for a new transmission may be set through RRC signaling.

If the required power ratio to transmit the $N_{min}$ PDUs is higher than the current grant, several options may be employed. Preferably, the power ratio is allowed to increase above the current grant to support the transmission of the PDUs. However, the power ratio may also stay at the current grant, with the WTRU 110 selecting the minimum E-TFC that can support the $N_{min}$ PDUs. Since more data is transmitted in this scenario for the same power, more hybrid automatic repeat request (HARQ) retransmissions for this MAC-e PDU will be required.

For example, assuming that a MAC-d flow has two configured RLC PDU sizes, 300 and 600 bits, a minimum power ratio required to transmit a MAC-e PDU may be assumed to be $(47/15)^2$ if it contains 2 RLC PDUs of 300 bits and $(53/15)^2$ if it contains a single RLC PDU of 600 bits. In a scenario where the PDU size of 300 bits is transmitted most of the time and the 600 bits is encountered infrequently, the power ratio granted to the WTRU 110 might be maintained at $(53/15)^2$ on the activated HARQ processes for WTRU 110. When an RLC PDU of 600 bits shows up at the head of the buffer, under the current standard with the MAC-d flow managed by scheduling grant, the transmission would block. With the hybrid non-scheduled/scheduled solution of the present embodiment of the invention, the WTRU 110 would be allowed to transmit its MAC-e PDU containing the RLC PDU of 600 bits and transmission would not be interrupted. For this MAC-e transmission, either the interference might be slightly higher than planned or there might be a higher probability of more HARQ retransmissions, depending on whether the power ratio is allowed to increase above the current grant or not.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:

1. A wireless transmit/receive unit (WTRU) comprising:
   a transmitter; and
   a processor, wherein:
   the transmitter and the processor are configured to transmit, on a condition that a serving grant having a non-zero value is too small for transmission of a single protocol data unit (PDU) from any scheduled medium access control-d (MAC-d) flow, scheduling information (SI).

2. The WTRU of claim 1, wherein the processor is further configured to produce a trigger on the condition that the serving grant is too small and the transmission of the SI is based on the produced trigger.

3. The WTRU of claim 1, wherein the single PDU is a radio link control (RLC) PDU.

4. The WTRU of claim 1, further comprising a receiver, wherein the receiver is configured to receive a relative grant and the processor is further configured to determine that the relative grant indicates a decrease in power, wherein the serving grant being too small is based on the received relative grant.

5. The WTRU of claim 4, wherein the relative grant is a non-serving relative grant.

6. The WTRU of claim 4, wherein the relative grant received is a serving relative grant and the serving relative grant is erroneously processed by the WTRU.

7. The WTRU of claim 4, wherein the relative grant is received from a base station.

8. The WTRU of claim 1, wherein a PDU of a first PDU of scheduled MAC-d flow is a first size and a second PDU of the scheduled MAC-d flow is a second size larger than the first size and the serving grant is too small based on the second size of the second PDU.

9. The WTRU of claim 1, wherein the processor is further configured to not segment PDUs at a medium access control (MAC) layer.

10. The WTRU of claim 1, wherein the transmission of the SI is further based on a buffer having data for enhanced dedicated channel (E-DCH) transmission.

11. The WTRU of claim 1, wherein the SI is transmitted to a base station.

12. A method implemented by a wireless transmit/receive unit (WTRU), the method comprising:
    transmitting scheduling information (SI) on a condition that a serving grant having a non-zero value is too small for transmission of a single protocol data unit (PDU) from any scheduled medium access control-d (MAC-d) flow.

13. The method of claim 12, further comprising: producing a trigger on the condition that the serving grant is too small and the transmission of the SI is based on the produced trigger.

14. The method of claim 12, wherein the single PDU is a radio link control (RLC) PDU.

15. The method of claim 12, further comprising: receiving a relative grant; and determining that the relative grant indicates a decrease in power, wherein the serving grant being too small is based on the received relative grant.

16. The method of claim 15, wherein the relative grant is a non-serving relative grant.

17. The method of claim 15, wherein the relative grant is a serving relative grant and the serving relative grant is erroneously processed by the WTRU.

18. The method of claim 15, wherein the relative grant is received from a base station.

19. The method of claim 12, wherein a PDU of a first PDU of scheduled MAC-d flow is a first size and a second PDU of the scheduled MAC-d flow is a second size larger than the first size and the serving grant is too small based on the second size of the second PDU.

20. The method of claim 12, wherein the WTRU is configured to not segment PDUs at a MAC layer.

21. The method of claim 12, wherein the transmission of the SI is further based on a buffer having data for enhanced dedicated channel (E-DCH) transmission.

22. The method of claim 12, wherein the SI is transmitted to a base station.

23. A wireless transmit/receive unit (WTRU) comprising:
    a transmitter; and
    a processor, wherein
    the transmitter and the processor are configured to:
    compare a non-zero serving grant value to a size of a single protocol data unit (PDU) of a scheduled medium access control-d (MAC-d) flow;

based on the comparison, determine whether to transmit scheduling information (SI); and based on the determination being to transmit the SI, transmit the SI.

\* \* \* \* \*